us007320258B2

(12) United States Patent
Tawara

(10) Patent No.: US 7,320,258 B2
(45) Date of Patent: Jan. 22, 2008

(54) STRUCTURE OF ATTACHING A ROTATION-DETECTING SENSOR

(75) Inventor: Hideo Tawara, Tsu (JP)

(73) Assignee: Sumiden Electronics, Ltd., Mie (JP)

( * ) Notice: Subject to any disclaimer, the term of this patent is extended or adjusted under 35 U.S.C. 154(b) by 0 days.

(21) Appl. No.: 11/525,015

(22) Filed: Sep. 22, 2006

(65) Prior Publication Data

US 2007/0089537 A1    Apr. 26, 2007

(30) Foreign Application Priority Data

Sep. 22, 2005    (JP)    ............................... 2005-275357

(51) Int. Cl.
*G01L 1/12*    (2006.01)
*G01B 7/30*    (2006.01)
*G01L 3/14*    (2006.01)
*G01B 3/48*    (2006.01)

(52) U.S. Cl. ............................. 73/862.69; 73/862.322; 324/207.25; 324/174; 384/448

(58) Field of Classification Search ............. 73/862.69, 73/862.322; 384/448, 489, 477, 544; 324/174, 324/207.25; G01P 3/487
See application file for complete search history.

(56) References Cited

U.S. PATENT DOCUMENTS

| 5,470,157 | A  | * | 11/1995 | Dougherty et al. | .......... | 384/448 |
| 6,499,885 | B2 | * | 12/2002 | Toda et al. | ................. | 384/448 |
| 6,924,638 | B2 | * | 8/2005 | Muramatsu et al. | ........ | 324/174 |
| 2007/0076993 | A1 | * | 4/2007 | Koyagi | ........................ | 384/448 |

FOREIGN PATENT DOCUMENTS

| JP | 5-302932 | 11/1993 |
| JP | 6-308145 | 11/1994 |
| JP | 7-198736 | 8/1995 |
| JP | 09-196945 A | * 7/1997 |

(Continued)

*Primary Examiner*—Edward Lefkowitz
*Assistant Examiner*—Jonathan Dunlap
(74) *Attorney, Agent, or Firm*—McDermott Will & Emery LLP

(57) ABSTRACT

An attaching structure of a rotation-detecting sensor comprises (a) a rotation-transferring medium, (b) a rotation-detecting sensor having (b1) a detection portion that detects a variation in magnetic field due to the rotation of the rotation-transferring medium to convert the variation into an electric signal and (b2) a main body having a plurality of side faces, (c) a flange that is provided at at least one side face of the main body of the rotation-detecting sensor, (d) an attaching member for the rotation-detecting sensor, the attaching member having an attaching hole into which the main body is inserted, concurrently with the flange being applied to the attaching member, and (e) a resin-molded body that (e1) covers by resin molding at least one part of the flange and a part of the attaching member to embed them in it and (e2) fixes the main body of the rotation-detecting sensor to the attaching member through the flange. The attaching hole of the attaching member also positions the rotation-detecting sensor. Even when the attaching hole is not filled with the resin-molded body because of the above-described positioning and the resin-molded body fails to achieve sufficient supporting force, the flange can securely fix the rotation-detecting sensor to the attaching member, because the flange is embedded in the resin-molded body and therefore can exercise the anchoring effect.

5 Claims, 4 Drawing Sheets

FOREIGN PATENT DOCUMENTS

| | | | |
|---|---|---|---|
| JP | 2001-174471 | | 6/2001 |
| JP | 2001-315501 A | * | 11/2001 |
| JP | 2004-132782 A | * | 4/2004 |
| JP | 2004-138458 | | 5/2004 |
| JP | 2004-205277 | | 7/2004 |
| JP | 2004-211832 A | * | 7/2004 |
| JP | 2005-98387 | | 4/2005 |
| JP | 2005-106238 | * | 4/2005 |
| JP | 2005-133772 A | * | 5/2005 |
| JP | 2006-125596 A | * | 5/2006 |

* cited by examiner

STRUCTURE OF ATTACHING A ROTATION-DETECTING SENSOR

BACKGROUND OF THE INVENTION

1. Field of the Invention

The present invention relates to a structure of attaching a rotation-detecting sensor such as a wheel-speed sensor to a rotation-supporting portion of a wheel axle of a motorcar.

2. Description of the Background Art

A motorcar generally incorporates several types of rotation-detecting sensors such as a sensor for detecting the rotation speed of the wheel and a sensor for detecting the number of rotations of the engine. Of these sensors, a wheel-speed sensor is shown in FIG. 5 together with an example of an attaching structure (see FIG. 5 of the published Japanese patent application Tokukaihei 06-308145).

The attaching structure is explained below. An outer cylinder constituting a wheel hub 1 is provided with a rotation-transferring medium B. An inner cylinder 2 is provided with a rotation-detecting sensor (wheel-speed sensor) P through a ring-shaped metallic attaching member 3. The variation in magnetic field due to the rotation of the rotation-transferring medium B is detected by the rotation-detecting sensor P. The detected signal is converted into an electric signal to be sent to the outside.

In the attaching structure of this conventional rotation-detecting sensor P, an attaching hole 4 for the rotation-detecting sensor P is formed in the attaching member 3. The rotation-detecting sensor P is fitted into the attaching hole 4, and a protrusion provided in the attaching hole 4 is fitted into a groove 5 of the rotation-detecting sensor P. Furthermore, the rotation-detecting sensor P is supported by a spring-type supporting member 6.

In addition, another structure has been disclosed (see claim 5 and FIG. 1 of the published Japanese patent application Tokukai 2004-138458). In this case, the rotation-detecting sensor P is fitted into a hole (pocket) of the attaching member 3. The rotation-detecting sensor P is fixed to the attaching member 3 with a resin-molded body that is formed by filling the hole with resin.

This type of wheel rotation portion is subjected to violent vibrations. In order to withstand it, the structure must be firm. However, in the attaching structure shown in FIG. 5, the secure holding of the rotation-detecting sensor P relies on the fitting into the groove 5 and the holding with the spring member 6. Therefore, to achieve a firm structure, the structure must be complicated, increasing the cost. Furthermore, the groove fitting and the holding with a spring have a limitation.

In addition, in the fixing with a resin-molded body disclosed in the foregoing Tokukai 2004-138458, the position of the rotation-detecting sensor P is usually determined by the insertion (fitting-in) of the rotation-detecting sensor P into the attaching hole. Consequently, the size of the attaching hole cannot be large, making it difficult to fill the attaching hole with the resin. As a result, the support of the rotation-detecting sensor P by the resin-molded body is not sufficient. In other words, the fact is that a firm supporting structure is not achieved.

In view of the above circumstances, the present invention intends to make it possible to attach the rotation-detecting sensor firmly with a simple structure.

SUMMARY OF THE INVENTION

The present invention has been made in view of the above circumstances. An object of the present invention is to offer a structure of attaching a rotation-detecting sensor, the structure firmly fixing the rotation-detecting sensor with a simple structure.

The present invention achieves the foregoing object by offering an attaching structure of a rotation-detecting sensor. The attaching structure comprises (a) a rotation-transferring medium, (b) a rotation-detecting sensor having (b1) a detection portion that detects a variation in magnetic field due to the rotation of the rotation-transferring medium to convert the variation into an electric signal and (b2) a main body having a plurality of side faces, (c) a flange that is provided at least one side face of the main body of the rotation-detecting sensor, (d) an attaching member for the rotation-detecting sensor, the attaching member having an attaching hole into which the main body of the rotation-detecting sensor is inserted, concurrently with the flange being applied to the attaching member, and (e) a resin-molded body that (e1) covers by resin molding at least one part of the flange and a part of the attaching member to embed them in the resin-molded body and (e2) fixes the main body of the rotation-detecting sensor to the attaching member through the flange.

The attaching hole of the attaching member also determines the position of the rotation-detecting sensor. Even when sufficient supporting force cannot be achieved by the resin-molded body because of the above-described position determining, the flange can securely fix the rotation-detecting sensor to the attaching member, because the flange is embedded in the resin-molded body and therefore can exercise the anchoring effect.

As described above, the present invention offers a structure in which the rotation-detecting sensor is fixed to the attaching member by using the resin-molded body that enables the flange to exercise the anchoring effect. Consequently, the rotation-detecting sensor can be securely fixed with a simple structure. As a result, the attaching cost of the rotation-detecting sensor can be reduced.

DESCRIPTION OF THE PREFERRED EMBODIMENT

Figure 1:
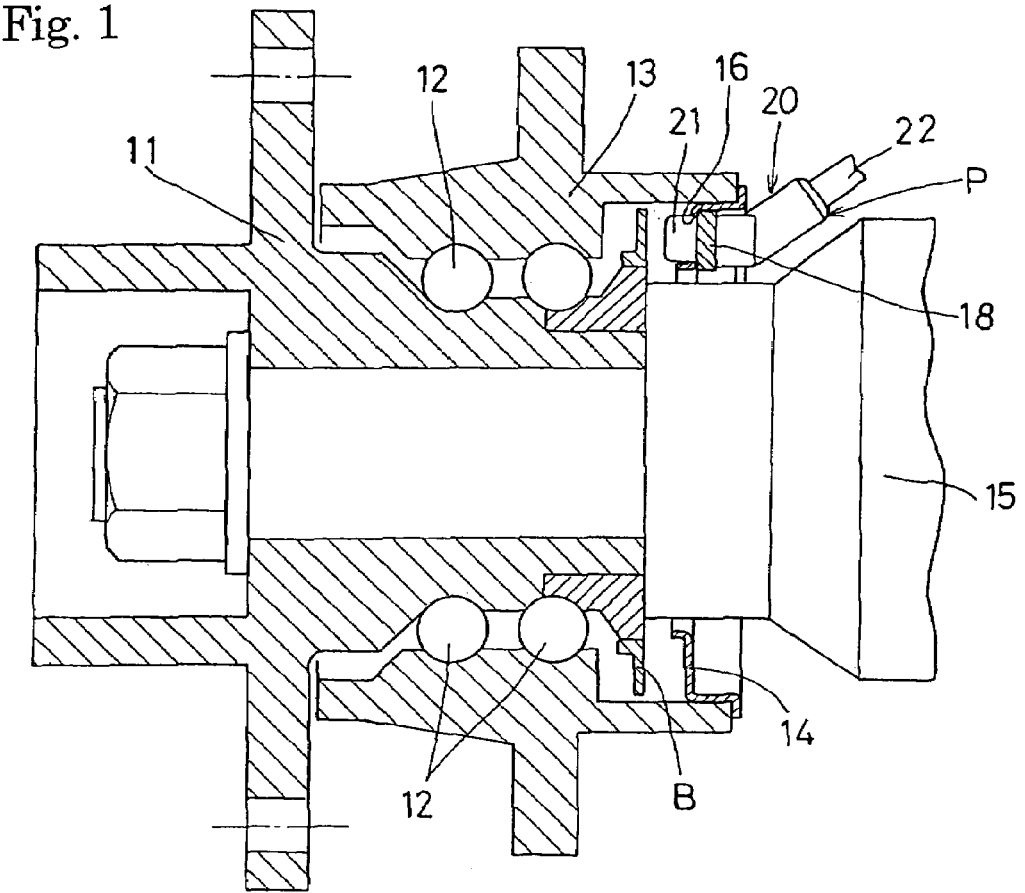
FIG. 1 is a cross-sectional view of an example.

As an embodiment of the present invention, as described in the section "Summary of the invention," the following structure can be employed. A main body of a rotation-detecting sensor has a detection portion that detects a variation in magnetic field due to the rotation of a rotation-transferring medium to convert it into an electric signal. A side face of the main body of the rotation-detecting sensor is provided with a flange. The main body of the rotation-detecting sensor is inserted into an attaching hole of an attaching member. Concurrently, the flange is applied to the attaching member. At least one part of the flange and a part of the attaching member are covered by resin molding to embed them in the resin-molded body. The resin-molded body fixes the main body of the rotation-detecting sensor to the attaching member through the flange.

In this case, it is not necessarily required to embed the entire flange into the resin-molded body. Providing that the anchoring effect is achieved, a part of the flange may be embedded.

In this structure, when the above-described attaching member is made of a thin plate, even when the attaching hole is filled with the resin, it is difficult to achieve sufficient supporting force, because the thickness is thin. Nevertheless, the anchoring effect of the flange is not affected by the thickness of the attaching member, making this structure particularly advantageous.

In addition, when the above-described flange is provided at opposing two side faces of the main body of the rotation-detecting sensor, the rotation-detecting sensor is supported by the anchoring effect at the opposing two side faces, increasing the fixing strength.

Furthermore, in addition to the above-described attaching hole, when the attaching member is provided with a supporting hole through which the resin-molded body penetrates, the fixing force of the resin-molded body to the attaching member is increased, further stabilizing the fixing of the rotation-detecting sensor. In this case, when the supporting hole is formed at both sides of the flange such that the supporting holes oppose each other across the flange, the resin-molded body encloses the flange to fix the flange to the attaching member, yet further stabilizing the fixing of the rotation-detecting sensor. The number of supporting holes is not limited to one for a single flange. Any number may be employed such as two or three.

These attaching structures of the rotation-detecting sensor can be employed not only in the attaching structure of (a) a speed sensor for detecting the rotation speed of a wheel and (b) a sensor for detecting the number of rotations of an engine but also in the attaching structure of various rotation-detecting sensors. For example, in the rotation-supporting portion of a wheel axle, a structure is employed in which an attaching member having a rotation-detecting sensor is attached to either the outer cylinder or the inner cylinder (fixed member) and a rotation-transferring medium is attached to the other cylinder (rotating member).

An attaching member having an attaching structure for such a rotation-detecting sensor can be combined with a rotation-detecting sensor. The attaching member having a rotation-detecting sensor can be supplied to a manufacturer of assembling a bearing unit of a wheel hub, for example.

EXAMPLE

FIGS. 1 to 3(b) show an example. The example relates to the rotation-supporting portion for the wheel axle of a motorcar. A wheel hub 11 as an inner cylinder is supported by an outer cylinder 13 through rolling elements (rollers) 12 such that the inner cylinder can rotate freely. The outer cylinder 13 is fixed to a knuckle (not shown) of the car body.

A rotation-transferring medium B is attached coaxially to the wheel hub 11. A wheel-speed sensor P as a rotation-detecting sensor is attached to the outer cylinder 13 through an attaching member 14. The attaching member 14 has the shape of a ring and is positioned at the outer periphery of a wheel axle 15. Because the wheel-speed sensor P is attached to the attaching member 14, the wheel-speed sensor P faces the rotation-transferring medium B to detect a variation in magnetic field due to the rotation of the rotation-transferring medium B. The detected signal is converted into an electric signal to be sent to the outside through a cord 22.

The wheel-speed sensor P has a structure in which the cord 22 is connected to a detecting portion 21, and the connecting portion between the detecting portion 21 and the cord 22 is covered by resin molding. As the detecting portion 21, as required, one of the following structures is employed, for example: (a) a structure that comprises a magnetism-detecting IC chip and an electronic part (circuit) for controlling the chip (see the published Japanese patent applications Tokukaihei 5-302932 and Tokukaihei 7-198736, for example) and (b) a structure in which a pole piece is provided inside a bobbin that winds and holds a coil, and a magnet is placed behind the pole piece (electromagnetic pickup) (see FIG. 1 and others of the published Japanese patent application Tokukai 2001-174471).

As its structure is explained above, the wheel-speed sensor's main body 20 is formed by covering the detecting portion 21 and the cord 22 by resin molding. At opposing two side faces of the main body 20, a flange 23 is unitarily formed at the time of the resin molding.

Figure 2A:
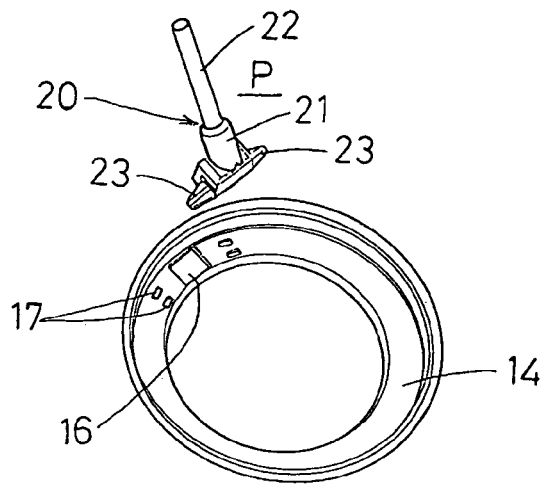
FIGS. 2(*a*), 2(*b*), and 2(*c*) are diagrams showing the method of the attaching of the wheel-speed sensor of the above example.
Figure 2B:
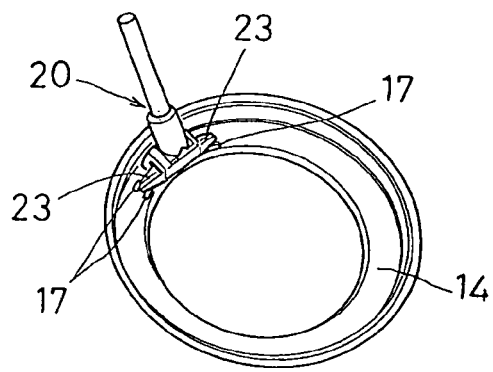
Figure 3A:
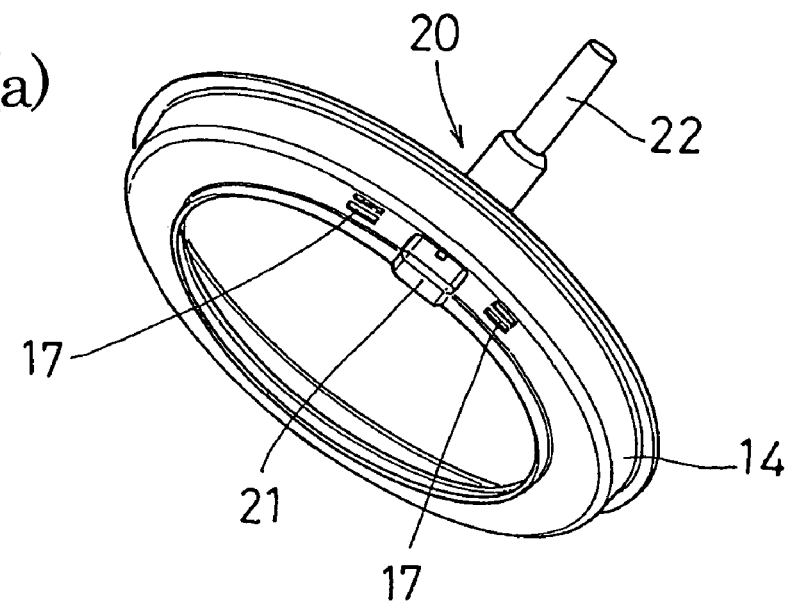
FIGS. 3(*a*) and 3(*b*) are diagrams showing the same method as above, but showing from a different direction.

The attaching member 14 is provided with (a) an attaching hole 16 having the shape of a square into which the detecting portion 21 of the wheel-speed sensor P is fitted and (b) supporting holes 17 at both sides of the attaching hole 16, the supporting holes 17 having an arrangement in which the hole 17 at the inner-diameter side of the attaching member 14 is coupled with the hole 17 at the outer-diameter side. When the detecting portion 21 of the wheel-speed sensor P is fitted into the attaching hole 16 to be positioned at the intended place, as shown in FIGS. 2(b) and 3(a), the supporting holes 17 are positioned at both sides of the flange 23.

Figure 2C:
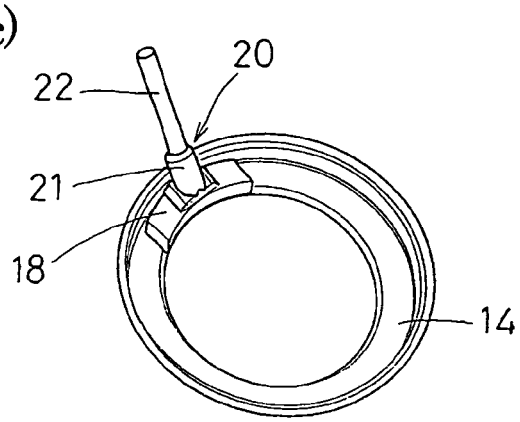
Figure 3B:
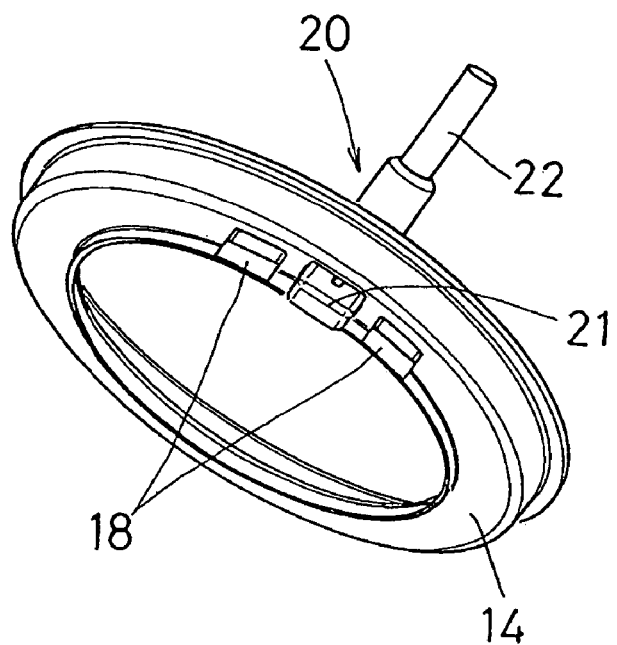
Figure 4:
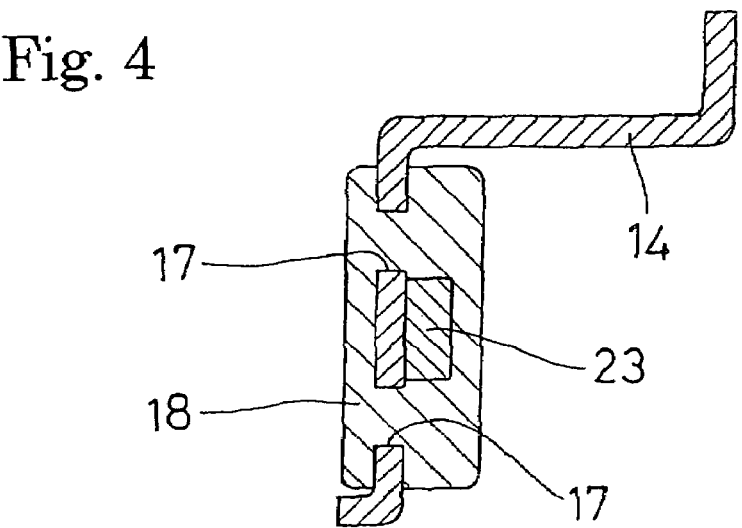
FIG. 4 is a cross-sectional view of a portion of the above example.

Consequently, as shown in FIGS. 2(c), 3(b), and 4, when the covering by resin molding is performed so as to enclose the detecting portion 21 and the flange 23 and to penetrate through the supporting holes 17 with some resin lying off the supporting holes 17 to enclose them, the shrinkage of the resin-molded body 18 firmly unifies the flange 23 with the attaching member 14.

The wheel-speed sensor P unified with the attaching member 14 maintains the state of the stable attaching to the attaching member 14, even when it undergoes violent vibrations due to sudden braking or running over a rough road.

In this example, the flange 23 is provided at both sides of the wheel-speed sensor's main body 20. Nevertheless, providing that the attaching condition is stable, the number of flanges 23 has no limitations. For example, the flange 23 may be provided only at one side face of the main body 20.

In addition, providing that the attaching condition is stable, the number of supporting holes 17 has no limitations. For example, they may be provided only at one side of the flange 23 or they may be provided at a plurality of positions along the length of the flange 23.

Furthermore, as shown in the figures, the resin-molded body 18 may be formed without covering the detecting portion 21 protruding from the attaching hole 16. However, providing that the detection is not adversely affected, the resin-molded body 18 may cover the protruding detecting portion 21. It is essential only that the range of the covering of the resin-molded body 18 has no limitation providing that the wheel-speed sensor P achieves sufficient fixing strength.

Figure 5:
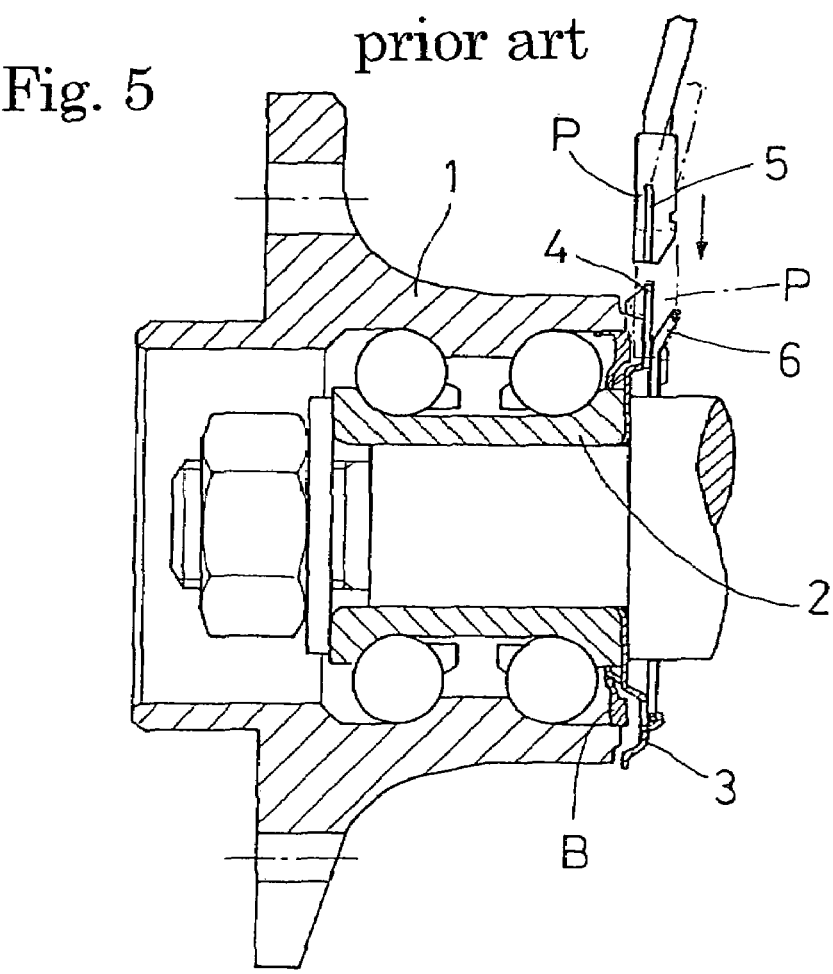
FIG. 5 is a cross-sectional view of a conventional example.

When the wheel hub 11 is used as an outer cylinder (in the case shown by FIG. 5 in the foregoing Tokukaihei 06-308145), the rotation-transferring medium B is attached to the outer cylinder, and the attaching member 14 of the wheel-speed sensor P is attached to the inner cylinder.

Of course, the present invention can be employed not only in the attaching structure of the wheel-speed sensor P but also in the attaching structure of a rotation-detecting sensor for detecting the number of rotations of an engine and in the attaching structure of various rotation-detecting sensors for use in other than vehicles.

What is claimed is:

1. An attaching structure of a rotation-detecting sensor, the attaching structure comprising:
   (a) a rotation-transferring medium;
   (b) a rotation-detecting sensor having:
      (b1) a detection portion that detects a variation in magnetic field due to the rotation of the rotation-transferring medium to convert the variation into an electric signal; and
      (b2) a main body having a plurality of side faces;
   (c) a flange that is provided at at least one side face of the main body of the rotation-detecting sensor;
   (d) an attaching member for the rotation-detecting sensor, the attaching member having an attaching hole into which the main body of the rotation-detecting sensor is inserted, concurrently with the flange being applied to the attaching member; and
   (e) a resin-molded body that:
      (e1) covers by resin molding at least one part of the flange and a part of the attaching member to embed them in the resin-molded body; and
      (e2) fixes the main body of the rotation-detecting sensor to the attaching member through the flange,
   wherein the attaching member further comprises, in addition to the attaching hole, at least one supporting hole through which the resin-molded body penetrates.

2. An attaching structure of a rotation-detecting sensor as defined by claim 1, wherein the attaching member is made of a plate having at least two ends bendable by 90 degrees with respect to the plate.

3. An attaching structure of a rotation-detecting sensor as defined by claim 1,
   wherein the flange is provided at opposing two side faces of the main body of the rotation-detecting sensor.

4. An attaching structure of a rotation-detecting sensor as defined by claim 1, wherein the at least one supporting hole is formed at both sides of the flange such that the supporting holes oppose each other across the flange.

5. An attaching structure of a rotation-detecting sensor as defined by claim 1, wherein:
   (a) a rotation-supporting portion of a wheel axle comprises an outer cylinder and an inner cylinder; and
   (b) the attaching member is attached to one of the outer cylinder and the inner cylinder, and the rotation-transferring medium is attached to the other.

* * * * *